United States Patent [19]

Premerlani

[11] 4,329,727
[45] May 11, 1982

[54] DIRECTIONAL POWER DISTANCE RELAY

[75] Inventor: William J. Premerlani, Scotia, N.Y.

[73] Assignee: General Electric Company, Schenectady, N.Y.

[21] Appl. No.: 169,434

[22] Filed: Jul. 16, 1980

[51] Int. Cl.³ .......................... H02H 3/16; H02H 3/18
[52] U.S. Cl. ......................................... 361/80; 361/82
[58] Field of Search ....................... 361/82, 80, 84, 87, 361/67

[56] References Cited

U.S. PATENT DOCUMENTS

| | | | |
|---|---|---|---|
| 3,673,425 | 6/1972 | Plichta | 361/82 X |
| 3,697,811 | 10/1972 | Little | 361/82 |
| 4,161,011 | 7/1979 | Wilkinson | 361/80 |

FOREIGN PATENT DOCUMENTS 1517551  7/1978  United Kingdom.

OTHER PUBLICATIONS

Dommel et al., "High Speed Relaying Using Traveling Wave Transient Analysis", Paper A-78-214-9, IEEE PES 1978, Winter Meeting, New York, N.Y.
Esztergalyos et al., "Development, Design Application and Field Experience of an Ultra High Speed Relaying System for EHV/UHV Transmission Lines", Pennsylvania Electric Association Relay Committee Mtg., October, 1978, Harrisburg, Pa.
Takagi et al., "Digital Differential Relaying System for Transmission Line Primary Protection Using Traveling Wave Theory—Its Theory and Field Experience", Paper A-79-096-9, IEE PES 1979 Winter Meeting, New York, N.Y.

Primary Examiner—Reinhard J. Eisenzopf
Attorney, Agent, or Firm—Marvin Snyder; James C. Davis

[57] ABSTRACT

A system for rapidly detecting short circuits on power transmission lines in electrical power systems is provided to protect the power network from the effects of short circuits within the system. The instant invention provides a system for detecting multi-phase faults and causing three-phase tripping when required and also detecting single-phase faults and providing a control signal to trip the single-phase that is faulted. Signals proportional to system voltages are applied to a memory circuit to produce signals indicative of the steady-state condition of the circuit. Three other signals indicative of the voltage drops of the transmission line phases are produced by applying a signal proportional to the instantaneous current flow through each phase to replica impedance circuits. For each phase, the difference between the voltage drop and the system voltage is multiplied by a polarizing memory voltage. The signal for each phase indicates the status of that phase and can be used to generate a single-phase trip signal for a single line to ground fault. By adding the three single-phase signals, a signal is produced that can be used to perform high speed detection of multi-phase faults. Following this determination the appropriate circuit breaker operating signal is provided to activate the circuit breaker or breakers protecting the part of the system faulted.

12 Claims, 9 Drawing Figures

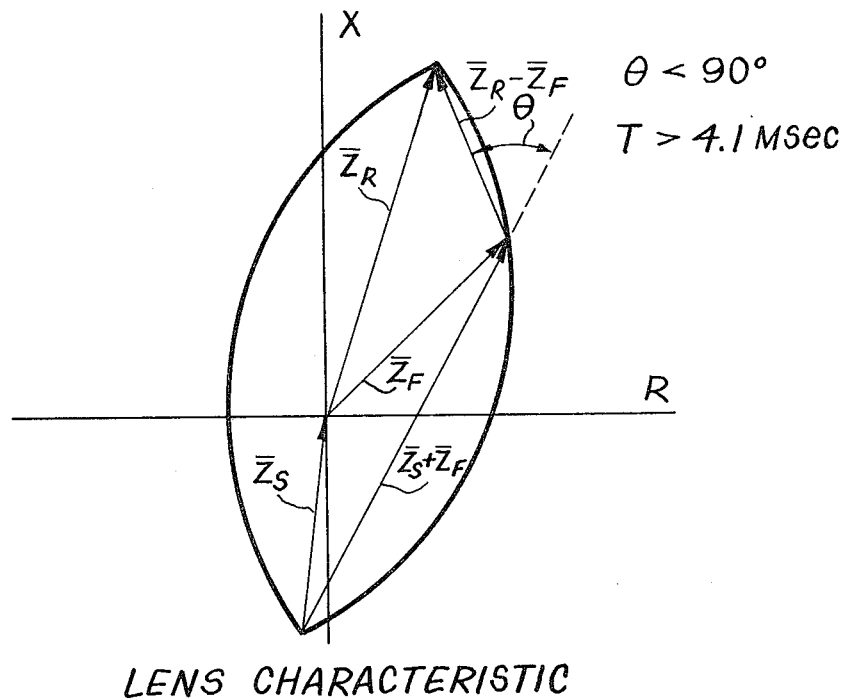
LENS CHARACTERISTIC
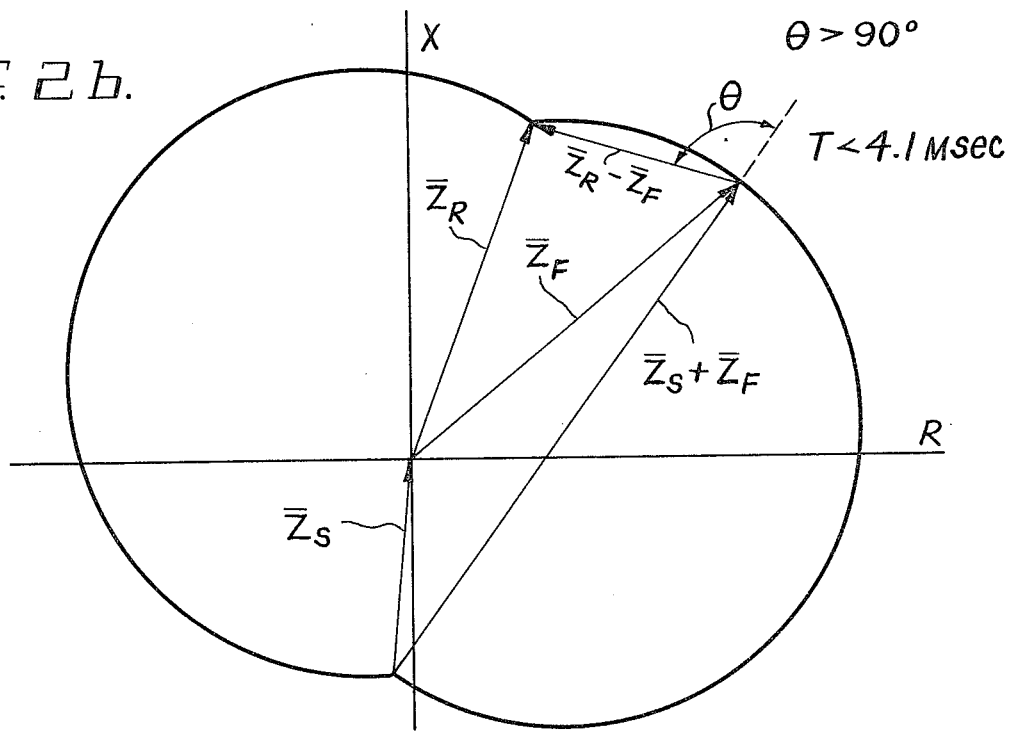
TOMATO CHARACTERISTIC

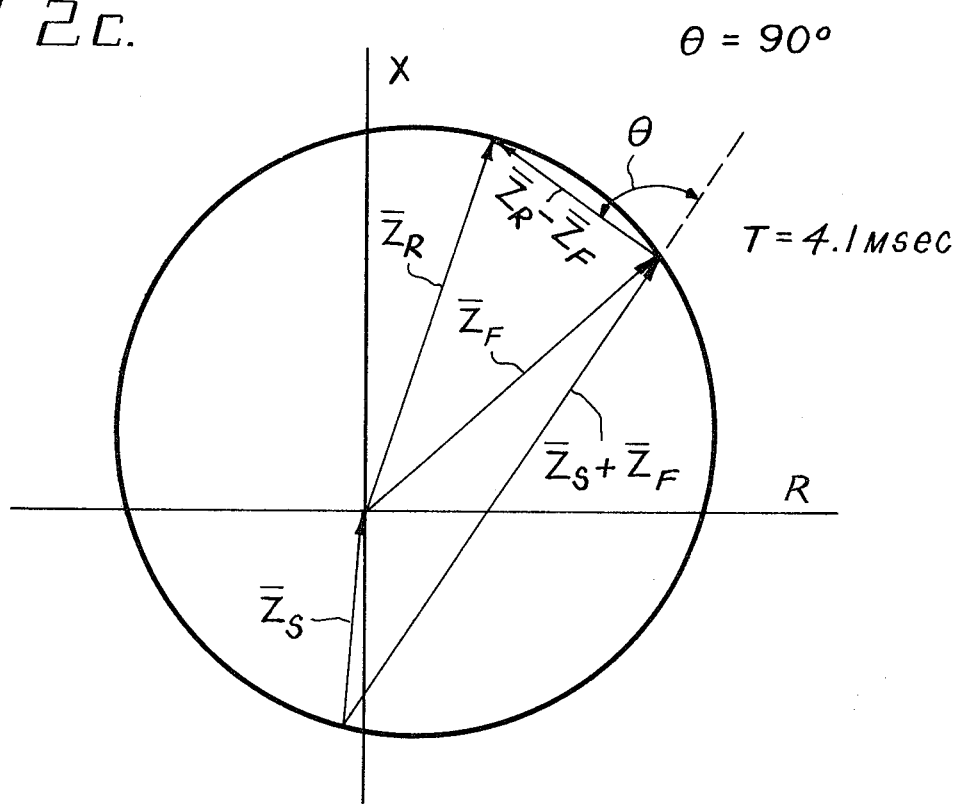
THREE PHASE TRIP
CHARACTERISTIC

DIRECTIONAL POWER DISTANCE RELAY

BACKGROUND OF THE INVENTION

This invention relates to electric power system relaying, and, more particularly, to high-speed relays for controlling the isolation of short circuits which occur on power system transmission lines.

As power systems have grown in the power transmission industry, the time available for protective equipment to remove faults and still maintain power system stability has been significantly reduced. There are two ways of keeping pace with system stability requirements; either faster relays or faster circuit breakers are required. The instant invention is directed to reducing relay time.

Conventional transmission line relays have reached an apparent response time limit of about 4 milliseconds, with a state-of-the-art limit of about 2.5 msec. To achieve faster response time in these conventional systems, system security would have to be comprised. System security requires that spurious operation inputs be ignored, so that system circuit breakers are not opened incorrectly during system disturbances that normally occur, but which do not interfere with system performance.

One approach to reducing relay time employs traveling wave concepts. These methods have been described by Dommel et al., "High Speed Relaying Using Traveling Wave Transient Analysis", Paper A-78-214-9, IEEE PES 1978 Winter Meeting, New York, NY and by Esztergalyos et al., "Development, Design, Application and Field Experience of an Ultra High Speed Relaying System for EHV/UHV Transmission Lines", Paper presented at the Pennsylvania Electric Association Relay Committee Meeting, October, 1978, Harrisburg, Pa. Because of the possibility of spurious input signals, the first wavefront to be received at the relay employing traveling wave concepts cannot be used by itself to make an operating decision. Some form of filtering, integrating or averaging of the signal must be done. The result is that the schemes respond not only to the first wavefront, but also to subsequent reflections of the first wavefront. Furthermore, since traveling waves can propagate through an entire power system, traveling wave schemes do not determine fault location. Although traveling wave schemes can be made to have distance properties by introducing a threshold, determining its magnitude precisely can be done only by extensive computer simulations. For these and other reasons including mutual coupling between adjacent lines on the same right-of-way, traveling wave schemes are not secure and are subject to generating incorrect trip signals during normal power system disturbances, such as switching surges and loss of communications channels, and can also trip the wrong circuit breakers during genuine short circuits.

Other techniques have been employed to achieve high speed relaying on transmission lines. For example, a fault simulation technique described in British Pat. No. 1,517,551, issued to Hughes Aircraft Co. on July 12, 1978, can rapidly detect single line to ground faults by comparing measured waveforms with simulated waveforms. However, the technique does not work well for multi-phase faults. As an example of a digital scheme, Takagi et al., "Digital Differential Relaying System for Transmission Line Primary Protection Using Traveling Wave Theory—Its Theory and Field Experience", Paper A-79-096-9, IEEE PES 1979 Winter Meeting, New York, NY, describe a method which compares the currents at opposite ends of the transmission line. However, the method cannot provide first zone distance protection without a reliable communications channel to link the line terminals.

SUMMARY OF THE INVENTION

An object of the instant invention is to minimize the power disturbance to a transmission system because of transmission line short circuits by rapidly detecting those types of short circuits which cause the greatest disturbances; namely, multi-phase faults. More particularly, an object of the instant invention is to provide ultra-high-speed fault detection and operation of circuit breakers in all three phases during multi-phase faults, and for single-phase faults, to provide high-speed clearing of the faulted phase only.

According to the instant invention, a method and apparatus are provided for protection for a power transmission line. Method and apparatus are provided for generating a single-phase discriminant for each phase line of the system, and summing the single-phase discriminant to produce a three-phase discriminant indicative of the presence of a multi-phase fault. In a particularly preferred embodiment, method and apparatus are also provided for generating a restraint signal to inhibit multi-phase tripping during single-line-to-ground faults.

BRIEF DESCRIPTION OF THE DRAWINGS

The features of the invention believed to be novel and unobvious over the prior art are set forth with particularity in the appended claims. The invention itself, however, as to organization, method of operation and advantages thereof, may best be understood by reference to the following description taken in conjunction with the drawings, in which:

FIGS. 2a, 2b and 2c are graphical representations of sensitivity characteristics of the instant invention;

DESCRIPTION OF THE PREFERRED EMBODIMENTS

Figure 1:
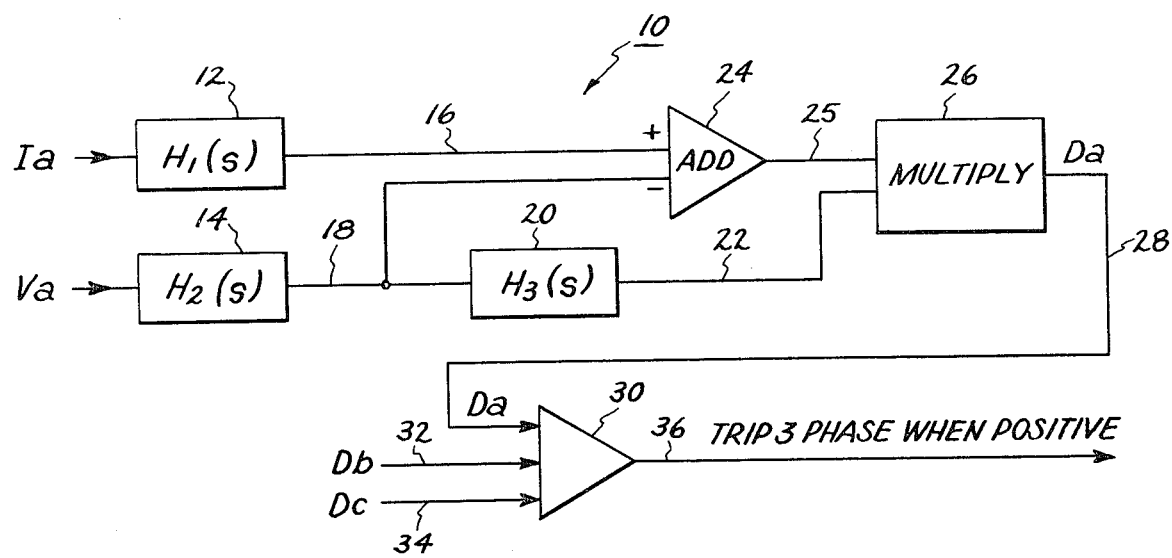
FIG. 1 is a schematic block diagram of a power distance relay according to the instant invention.
Figure 3:
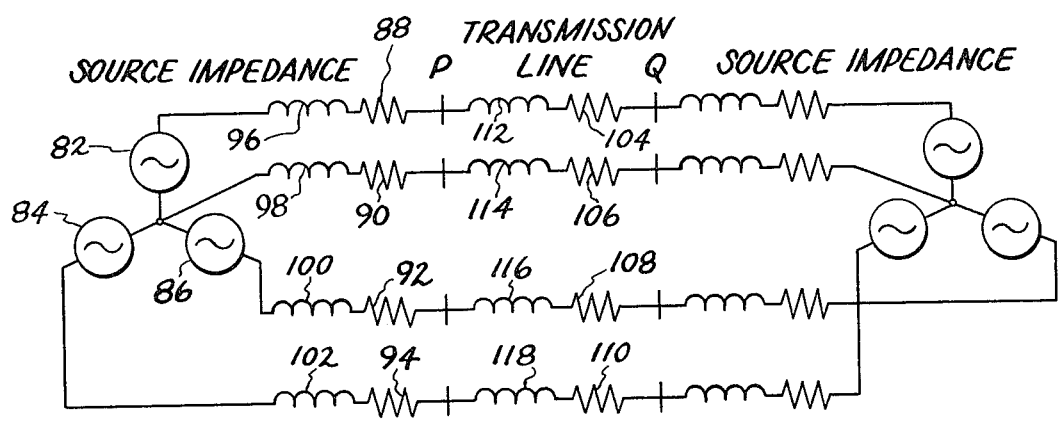
FIG. 3 is a schematic circuit diagram of a power system model used to test a particular embodiment of the instant invention.

The specific features of the instant invention described herein and shown in FIGS. 1-6 are merely exemplary, and the scope of the invention is defined in the appended claims. Throughout the description and FIGS. 1-6, like reference characters refer to like elements of the invention.

In FIG. 1 is shown a block diagram of a directional power relay 10 according to the instant invention. The outputs from a current transformer terminated with a resistive burden is used to produce a signal proportional to the instantaneous value of line current in each of the three phases of a three-phase transmission system. Signals from voltage dividers that are representative of the line to neutral voltages also provide signals to the relay.

The current signal $I_a$ from phase a is input to a combination filter and replica impedance 12 that can be functionally represented by the Laplace transform, $(R+sL)/(1+s\tau)$. Any circuit technique, active or passive, that realizes this transfer function, will be adequate. For example, it can be realized with a reactive CT burden. Alternatively, it can be realized with operational amplifiers with feedback networks. The R and L of the function are set to the positive sequence resistance and inductance, respectively, of the length of transmission line to be protected. R and L together are commonly known as a replica impedance. The $(1+s\tau)$ function represents a first order filtering action to remove unwanted noise, with $\tau$ determining the cutoff frequency. Other filter types, such as second order, can be used, depending on the expected level of noise. The voltage signal $V_a$ is filtered by a circuit element 14 which has the same filtering characteristic included in the processing of the current signal by replica impedance 12, and which can be realized in a similar fashion.

The output signal 16 is the voltage drop along the transmission line that would be associated with a current equal to the measured current flowing through an impedance equal to the replica impedance. This establishes the range of fault locations (i.e., maximum distance from the fault to the relay) that will trip the relay, commonly known as the relay reach. For a fault at a location on the line that establishes a line impedance between the relay and the fault equal to the replica impedance, the relay is on the verge of tripping. For faults closer to the relay than this reach point, the relay trips. This is illustrated graphically in FIG. 2c. The replica impedance determines a zone of values of fault impedance that will trip the relay.

The output 16 from the replica impedance circuit 12 and the output 18 of the voltage filter 14 are fed to an adder 24 which produces as an output 25 an operate signal representative of the difference between the replica impedance voltage drop 16 and the line to neutral voltage 18. The filtered line voltage 18 is fed into a memory circuit 20 to produce as an output 22 a polarizing signal indicative of what the line voltage signal would be if no disturbance occurred on the line. This so-called polarizing voltage can be achieved in a variety of ways, including passive or active circuit networks. One way is to use operational amplifiers with feedback to achieve the transfer function $H_3(s)$ equal to:

$$H_3(s) = \frac{\frac{s}{\omega_o Q}}{1 + \frac{s}{\omega_o Q} + \frac{s^2}{\omega_o^2}}$$

where
$\omega_o$ = radian power frequency,
Q = memory quality factor, and
s = Laplace transform variable.

The operate signal 25 and the polarizing signal 22 are fed to an electronic multiplier circuit 26. The output 28 of the multiplier 26 and outputs of similar multipliers attached to similar circuitry connected with each phase of a multiphase line are provided as inputs 28, 32, 34, respectively, to an adder 30 which produces as its output a discriminant 36, representative of the state of the phase lines within the multi-phase system. The output 36 of the adder 30, i.e., the discriminant, can be used to detect multi-phase faults. When two 60 Hz signals are multiplied, the result contains DC and 120 Hz signal components. Thus, the output 28 of the multiplier 26 contains DC and 120 Hz voltage signals. Each of the phase line discriminants $D_a$, $D_b$ and $D_c$, i.e., inputs 28, 32, 34, respectively, will be negative when the respective phase line is operating in the normal, unfaulted condition. Therefore, when the discriminant 36 is positive, at least two phase lines are faulted, (e.g., at least two line-to-ground faults, a line-to-line fault or a three-phase fault exists), and a multi-phase fault within the reach setting of the relay is indicated. For unfaulted conditions or for faults behind the relay or beyond its reach setting, the discriminant 36 remains negative.

The operation of the relay can be understood by considering the signal components in the output 28 of the multiplier 26. Multiplication of two 60 Hz signals produces DC and 120 Hz signal components according to the relationship:

$$V_1 \cos(\omega t + \phi_1) \cdot V_2 \cos(\omega t + \phi_2) = \tfrac{1}{2} V_1 V_2 [\cos(\phi_2 - \phi_1) + \cos(2\omega t + \phi_1 + \phi_2)].$$

The DC component is proportional to the product of the magnitudes of the multiplied signals 22, 25 times the cosine of their relative phase angles. The 120 Hz component has a magnitude equal to the product of the magnitudes of the multiplied signals 22, 25 with a phase angle equal to the sum of the phase angles of the multiplied signals 22, 25. Under balanced conditions, the relative phase angles of the 120 Hz components of the discriminants 28, 32, 34, associated with each of the three phases, respectively, is 120 degrees. Thus, under balanced conditions, the sum of the 120 Hz components is zero, and the output 36 of the discriminant adder 30 contains only a DC signal component, and the discriminant 36 is equal to 3/2 times the product of the magnitude of the operate signal 25 times the magnitude of the polarizing signal 22 times the cosine of their relative phase angle. For three-phase short circuits outside the reach of the relay, the angle is greater than 90 degrees, so the discriminant 36 is negative, indicating no trip. For faults within the reach, the angle is less than 90 degrees, causing discriminant 36 to be positive. This yields a three-phase trip zone as shown in FIG. 2c.

For a three-phase fault, the speed of response is limited only by the time delay associated with the input filtering 12, 14. This is because the 120 Hz components in the signals 28, 32 and 34 maintain their balanced relationship, summing to zero. The DC component changes instantaneously.

For unbalanced faults such as line-to-line and double-line-to-ground there are 120 Hz as well as DC signal components present in the discriminant 36. Signal component analysis reveals that the reach of the relay is the same for line-to-line, double-line-to-ground and three-phase faults. However, because of the 120 Hz components present in the discriminant 36 during unbalanced faults, some delay is experienced. The maximum delay is the time between negative and positive peaks of the 120 Hz signal (4.16 msec.). Thus, the maximum time for detection of line-to-line and double-line-to-ground faults is 4.16 msec. plus the filter delay. Depending on the fault closing angle, the actual detection time may be less than this time.

Figure 4:
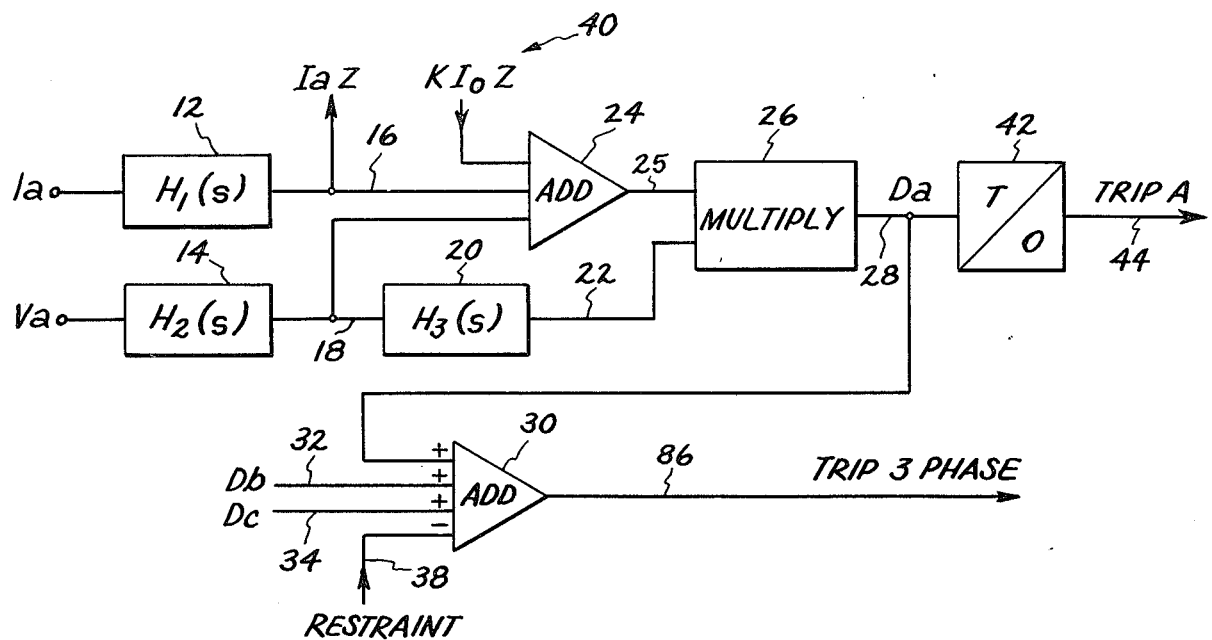
FIG. 4 is a schematic block diagram of a directional power relay employing a restraining circuit according to the instant invention.
Figure 5:
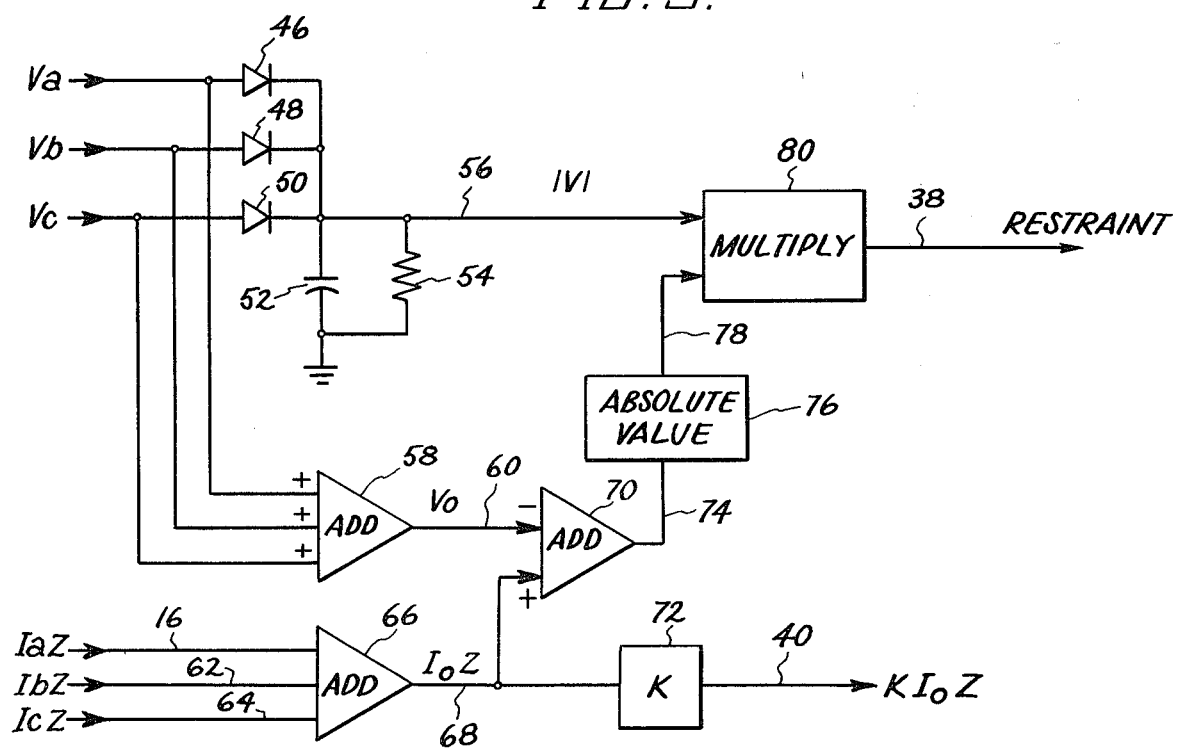
FIG. 5 is a schematic block diagram of a restraining circuit according to the instant invention.

If it is desired to rapidly generate a three-phase trip signal for all internal multi-phase faults and for severe internal single-phase faults, the relay in FIG. 1 is sufficient. However, it may be desirable in many applications to generate three-phase trips only for multi-phase faults and to additionally generate single-phase trips for single-line-to-ground faults. The preferred embodiment shown in FIGS. 4 and 5 provides that capability. The relay shown in FIGS. 4 and 5 is similar to that shown in FIG. 1, except circuitry has been added to restrain three-phase operation and to produce single-phase trip signals for single-line-to-ground faults.

The restraint circuitry is shown in FIG. 5. Diodes 46, 48, 50 and R-C filter 52, 54 are used to obtain the magnitude (absolute value) of the system voltage 56. For power systems in which the voltage at the relay does not vary over a wide range, this circuit could be omitted. The line to neutral voltages are added by an electronic adder 58 to produce a signal 60 representative of the zero sequence voltage. Outputs 16, 62, 64, available from the three replica impedance circuits of the relay, are input to an adder 66 to produce a signal 60 representative of the zero sequence current times the three-phase replica impedance. An adder 70 substracts the sum of the phase voltages 60 from the zero sequence current signal 68 to produce a zero sequence operate signal 74. An absolute value circuit 76 full wave rectifies the zero sequence operate signal 74 to produce a full wave rectified signal 78. A multiplier 80 scales the rectified signal 78 by the system voltage 56 to produce a zero sequence restraint signal 38. This restraint signal 38 is subtracted from the sum of the three-phase discriminants 28, 32 and 34 by adder 30, FIG. 4, to produce a three-phase trip signal 86.

Figure 6A:
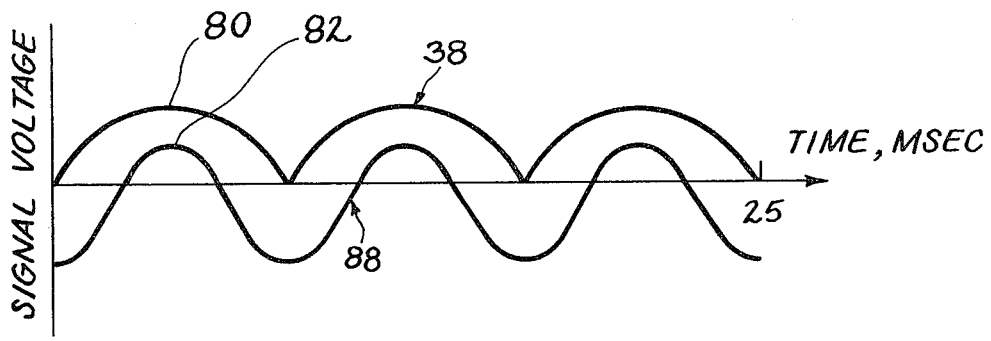
FIGS. 6a and 6b illustrate the waveforms for single-line-to-ground faults and double-line-to-ground faults, respectively, with the restraint waveforms superimposed thereon.
Figure 6B:
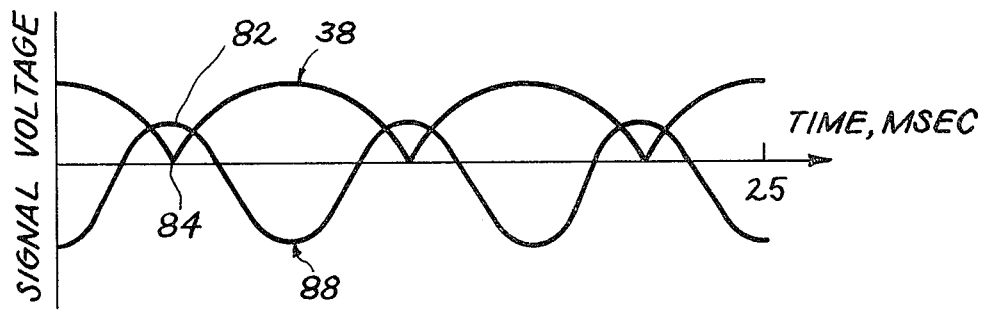

The effect of restraint during ground faults is shown in FIG. 6. Restraint signal 38 and the sum 88 of the discriminants 28, 32, 34 are plotted versus time in FIGS. 6a and 6b. For single-phase, i.e., line-to-ground, faults, the peaks 82 in signal 88 occur at peaks 80 of restraint signal 38, FIG. 6a, and the relay is restrained, since the sum remains negative. For double-line-to-ground faults, peaks 82 in 88 occur at minimum points 84 of 38, FIG. 6b, and the relay is free to operate. For three-phase faults and line-to-line faults, $V_a + V_b + V_c = 0$ and $I_a + I_b + I_c = 0$ and the output 38 of the restraint circuit is zero and three-phase tripping is not affected.

In order to detect single-line-to-ground faults and generate a single-phase trip signal, a delay timer 42 is added to each phase and the sensitivity to line-to-ground faults is adjusted by adding a portion of the neutral current times replica impedance to the operate signal. (See FIGS. 4 and 5.) The signal is obtained simply by an amplifier 72 in the restraint circuit. The gain, K, is set to $(|Z_0/Z_1| - 1)/3$ to reflect the ratio of the zero to positive impedance of the line being protected. By using this correction factor, the reach of the relay for single-line-to-ground faults is made the same as for multi-phase faults. To detect single-phase faults, for phase a, output signal 40 is input to adder 24 and a timer 42 monitors the phase discriminant 28. When the phase discriminant 28 is positive, the timer 42 begins timing. If, after T second, the input 28 to the timer is still positive, a single phase trip 44 is output. If the input 28 swings negative before T seconds, the timer 42 is reset. A similar arrangement is employed for each of the remaining phases b and c.

The time duration of positive excursions is determined by fault location. By appropriate selection of the time interval, either a lenticular, FIG. 2a, circular, FIG. 2c, or "tomato", FIG. 2b, reach characteristic can be obtained. These characteristics can be understood with the aid of the approximate system model shown in FIG. 3. The sources 82, 84, 86 feeding a bus at "P" are modeled by three-phase open circuit voltages behind equivalent source resistances 88, 90, 92, 94 and inductances 96, 98, 100, 102, respectively. This represents an equivalent circuit for the power system connected to the bus at "P". A similar model is used for the sources feeding a bus at "Q". The transmission line connecting the two buses is also represented by series resistances 104, 106, 108, 110 and inductances 112, 114, 116, 118, respectively.

The timer 42 trips if the angle between the operate 25 and polarizing 22 signals is small enough to make the DC component of the discriminant 28 large enough to make the discriminant exceed zero for a sufficient time duration for the timer to time out. Neglecting load current, the polarizing voltage 22 is related to the fault current by:

$$V_{polarize} = \bar{I}(\bar{Z}_s + \bar{Z}_F)$$

where $\bar{Z}_s$ and $\bar{Z}_F$ are complex impedances, $\bar{Z}_s$ = impedance of the source, $\bar{Z}_F$ = line impedance from the relay to the fault. The operate signal 25 is related to the fault current by:

$$V_{operate} = \bar{I}(\bar{Z}_R - \bar{Z}_F),$$

$\bar{Z}_R$ = replica impedance. The phase angle between $\bar{I}(\bar{Z}_s + \bar{Z}_F)$ and $\bar{I}(\bar{Z}_R - \bar{Z}_F)$ is the same as that between $\bar{Z}_s + \bar{Z}_F$ and $\bar{Z}_R - \bar{Z}_F$. Thus, tripping occurs when the angle between $\bar{Z}_s + \bar{Z}_F$ and $\bar{Z}_R - \bar{Z}_F$ is smaller than a certain critical angle. The angle is related to the timer delay T. For a short delay and the angle can be large. For a long delay, the angle must be small. For a small angle, $\Theta < 90°$, the values of $\bar{Z}_F$ that will trip the relay fall within the lens shape shown in FIG. 2a. For a large angle, $\Theta > 90°$, the values of $\bar{Z}_F$ that will trip the relay fall within a tomato shape shown in FIG. 2b. For $\Theta = 90°$, the trip zone is as shown in FIG. 2c. These shapes are segments of circles, with the phasor $\bar{Z}_s + \bar{Z}_R$ being a chord.

As will be obvious to those of ordinary skill in the art, the instant invention provides a means for rapid fault detection and location and simultaneously provides good system security to prevent unnecessary circuit interruption. Employing the directional power distance relay of the instant invention, I am able to detect three-phase faults nearly instantaneously without risking unnecessarily interrupting the three-phase system, i.e., without degrading system security. This is due to the fact that the system discriminant will only be negative when at least two phases are faulted and the elimination of all but the DC signal in three-phase fault situations.

For phase-to-phase faults average detection time is significantly reduced from conventional relay detection time, since the response time is no more than peak-to-peak time delay for a 120 Hz signal plus filtering delay. Again system stability is maintained. Phase-to-phase faults are detected in no more than 4.1 msec., the peak-to-peak time for a 120 Hz signal, compared to at least 4.1 msec. response time of conventional systems. In fact, depending on fault location and fault closing angle, phase-to-phase faults can be detected nearly instantaneously, with no sacrifice of system security, while depending upon the same details, the response time of conventional systems will exceed 4.1 msec.

For single-phase faults the system of FIG. 1 ignores such faults, and the system of FIGS. 5 and 6 provides a rapid single-phase trip signal of controllable sensitivity. The response time of the instant invention to single-phase faults is similar to that of conventional systems, with no reduction in system security.

I claim:

1. A method of detecting power line faults in a three-phase power line to select the correct circuit breaker opening operation comprising:
   (a) generating a single-phase discriminant for each single-phase line of said three-phase power line by multiplying an operate signal and a polarizing signal for said single-phase line wherein said single-phase discriminant is indicative of the presence or absence of a fault on said single-phase line within the reach of a relay; and
   (b) summing the single-phase discriminants to produce a three-phase discriminant indicative of presence or absence of a fault on more than one of said three phases;
   (c) wherein said operate signal is related to the difference of (1) the product of the current and a replica impedance for said single-phase line and (2) the voltage of said single-phase line; and
   (d) wherein said polarizing signal is related to the voltage of said single-phase line.

2. The method of claim 1 wherein each said operate signal is generated by:
   (a) multiplying a signal proportional to the line current in said one phase line of said multiphase power line by a replica impedance;
   (b) filtering the voltage signal of said single-phase line to produce a voltage signal proportional to the voltage of said single-phase line; and
   (c) comparing said single-phase line voltage to the output voltage signal of said replica impedance to produce a voltage signal representative of the difference between said single-phase line voltage and said output voltage signal of said replica impedance.

3. The method of claim 2 wherein each said polarizing signal is generated by:
   applying said voltage signal proportional to the voltage of said single-phase line to a memory circuit to produce an output signal from said memory circuit proportional to the voltage of said single-phase line under normal operating conditions.

4. The method of claim 3 further comprising:
   generating a restraint signal indicative of a fault in one of said single-phase lines; and
   summing said restraint signal with said single-phase discriminants to inhibit generation of a three-phase trip signal when only a single-phase fault occurs.

5. The method of claim 4 wherein said step of generating a restraint signal comprises:
   (a) rectifying voltage signals of each of the single-phase lines and summing the rectified voltages to produce a single voltage signal proportional to the absolute value of the system voltage;
   (b) multiplying current signals of each of the single-phase lines with respective replica impedance circuits to produce output voltage signals proportional to the products of the respective currents and replica impedance circuits and summing the output signals from the replica impedances;
   (c) summing the voltage signals from the respective single-phase lines;
   (d) summing the resultant sum of the voltage signals and the resultant sum of the replica impedance signals;
   (e) converting the sum obtained in step (d) to its absolute value; and
   (f) multiplying the absolute value signal and the signal proportional to the absolute value of the system voltage.

6. The method of claim 5 further comprising:
   adding a signal proportional to the sum of the phase currents times the replica impedances to the operating signal for each of said single-phase lines; and
   applying each single-phase discriminant to a respective delay timer to generate as an output of each of said timers a respective single-phase line trip signal.

7. A directional power distance relay for a three-phase power line comprising:
   (a) means for generating a single-phase discriminant for each respective single-phase line of said three-phase power line indicative of the presence or absence of a fault on said respective single-phase line within the reach of said relay; and
   (b) first electronic summing means for providing a three-phase discriminant indicative of simultaneous presence or absence of a fault on more than one of said single-phase lines;
   (c) wherein said means for generating a single-phase discriminant comprises for each respective single-phase line:
      (1) means for generating an operate signal;
      (2) means for generating a polarizing signal; and;
      (3) first multiplying means for multiplying said operate signal and said polarizing signal;
      (4) wherein said operate signal is related to the difference of (1) the product of the current and a replica impedance for said each respective single-phase line and (2) the voltage of said each respective single-phase line; and
      (5) wherein said polarizing signal is related to the voltage of said each respective single-phase line.

8. The apparatus of claim 7 wherein said means for generating an operate signal comprises for each single-phase line:
   (a) a single-phase current filtering means connected to a respective one of said single-phase lines;
   (b) a replica impedance connected to each single-phase current filtering means to produce an output for each respective single-phase line equal to the single-phase line current times the replica impedance;
   (c) a single-phase voltage filtering means connected to a respective one of said single-phase lines; and
   (d) a second electronic summing means connected to said respective replica impedance and single-phase voltage filtering means to sum said output signals from said respective replica impedance and single-phase voltage filtering means; the output of said second summing means being operatively connected as an input to said first multiplying means.

9. The apparatus of claim 8 wherein said means for generating a polarizing signal comprises for each respective single-phase line:
   a memory circuit connected to said respective single-phase voltage filtering means to produce an output voltage signal proportional to the voltage signal of said respective single-phase line under normal operating conditions; the output of said memory circuit being said polarizing signal and being connected as an input signal to said first multiplying means.

10. The apparatus of claim 9 further comprising:
means for generating a restraint signal connected to said first summing means to inhibit three-phase tripping under single-phase fault conditions.

11. The apparatus of claim 10 wherein said means for generating said restraint signal comprises:
(a) a plurality of rectifiers connected to each of said phase lines, respectively, to produce a rectified voltage signal from each respective single-phase line;
(b) a first absolute value filter circuit connected to the outputs of all the respective rectifiers for producing a signal proportional to the absolute value of system voltage;
(c) a plurality of replica impedance circuits connected to the respective single-phase lines to produce output voltage signals proportional to the single-phase current signals times the respective replica impedances;
(d) third summing means for summing the output signals of said replica impedance circuits;
(e) fourth summing means for summing the single-phase voltage signals;
(f) fifth summing means for summing the output signals from said third and fourth summing means;
(g) a second absolute value filter circuit for producing a voltage signal proportional to the absolute value of the output of said fifth summing means; and
(h) second multiplying means connected to said first absolute value filter and said second absolute value filter for multiplying the output signals thereof; the output signal of said second multiplying means comprising said restraint signal.

12. The apparatus of claim 11 further comprising:
a circuit connected to the output of said third summing means for producing a signal proportional to the neutral current times the replica impedance connected to said respective second summing means; and
a plurality of delay timers connected to respective ones of said first multipliers to provide single-phase trip signals for respective single-phase lines.

* * * * *